(12) United States Patent
Kato

(10) Patent No.: US 6,504,576 B2
(45) Date of Patent: *Jan. 7, 2003

(54) DIGITAL SIGNAL CODING METHOD AND APPARATUS, SIGNAL RECORDING MEDIUM, AND SIGNAL TRANSMISSION METHOD FOR RECORDING A MOVING PICTURE SIGNAL AND AN ACOUSTIC SIGNAL

(75) Inventor: Motoki Kato, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,436

(22) Filed: Jun. 19, 1998

(65) Prior Publication Data

US 2002/0039384 A1 Apr. 4, 2002

(30) Foreign Application Priority Data

Jun. 25, 1997  (JP) .............................................. 9-169198

(51) Int. Cl.[7] ................................................. H04N 7/18
(52) U.S. Cl. .................................. 348/423; 375/240.27
(58) Field of Search ................................ 348/423, 422, 348/424, 462, 465, 463, 7, 10; 375/240.26, 240.28

(56) References Cited

U.S. PATENT DOCUMENTS 5,461,619 A  10/1995  Citta et al.
5,521,927 A  * 5/1996  Kim et al. ..................... 370/99
5,550,589 A  8/1996  Shiojiri et al.
5,606,369 A  2/1997  Keesman et al.
5,894,328 A  * 4/1999  Tahara et al. ................ 348/423
5,926,649 A  * 7/1999  Ma et al. ........................ 348/7
5,999,533 A  * 12/1999  Peres et al. .................. 370/395

FOREIGN PATENT DOCUMENTS

| EP | 0 493 136 | 7/1992 |
| EP | 0 676 756 | 10/1995 |
| WO | 96/26608 | 8/1996 |
| WO | 97/18676 | 5/1997 |

* cited by examiner

Primary Examiner—Andy Rao
(74) Attorney, Agent, or Firm—Frommer Lawrence & Haug LLP; William S. Frommer

(57) ABSTRACT

The present invention enables to establish a safe multiplex schedule, eliminating a signal deterioration even when a delay amount in a coded signal buffer is reduced.

An input video signal from a terminal 10 is supplied to a frame memory 11. An image coding controller 12 reads in a video signal S11 from the frame memory 11 and calculates an assignment coding bit amount S12 for coding each of the pictures and a picture coding parameter S17. A video encoder 13 executes a coding processing according to these information items S12 and S17. The assignment coding bit amount S12 and the coding parameter S17 are also supplied to a multiplex scheduler 22 where a multiplex schedule is established so as to prevent destruction of a buffer of a decoder side.

10 Claims, 10 Drawing Sheets

| | | | | | | | |
|---|---|---|---|---|---|---|---|
| FIG.7A MOVING PICTURE INPUT | F0<br>f0 | F1<br>f1 | F2<br>f2 | F3<br>f3 | F4<br>f4 | F5<br>f5 | F5<br>f5 |
| FIG.7B frame_input | 1 | 1 | 1 | 1 | 1 | 1 | |
| FIG.7C top_field_first | 1 | 1 | 0 | 0 | 1 | 1 | |
| FIG.7D repeat_first_field | 0 | 0 | 0 | 1 | 0 | 1 | |
| FIG.7E picture_coding_type | B0 | B1 | I2 | B3 | B4 | P5 | |
| FIG.7F ENCODING TIME | | | I2 | B0 | B1 | P5 | B3 | B4 |
| FIG.7G DECODING TIME (DTS) | | | I2 | B0 | B1 | P5 | B3 | B4 |
| FIG.7H DISPLAY TIME (PTS) | | | B0 | B1 | I2 | B3 | B4 | P5 |
| FIG.7I MOVING PICTURE OUTPUT | | | F0<br>f0 | F1<br>f1 | F2<br>f2 | F3<br>f3 | F4<br>f4 | F5<br>f5 | F5<br>f5 |

```
calc_DTS_and_PTS () {
        prev_repeat_first_field = 1;
        delta = 1 / 29. 97;
        TS = DTS0;
        i = 0;
        while (i ! = End_Of_File) {
           DTS [i] = TS;
           if (picture_coding_type [i] == "B") {
              PTS[i] = TS;
              TS = TS + delta*(repeat_first_field [i]+2)/2;
           }
           else {
              if (i ! = 0) PTS [prev_IP] = TS;
              TS = TS + delta*(prev_repeat_first_field+2)/2;
              prev_repeat_first_field = repeat_first_field[i];
              prev_IP = i;
           }
        }
        PTS[prev_IP] = TS;
}
```

FIG.8 ns of an input
DIGITAL SIGNAL CODING METHOD AND APPARATUS, SIGNAL RECORDING MEDIUM, AND SIGNAL TRANSMISSION METHOD FOR RECORDING A MOVING PICTURE SIGNAL AND AN ACOUSTIC SIGNAL

BACKGROUND OF THE INVENTION

1. Field of the Invention

The present invention relates to a digital signal coding method and apparatus, a signal recording medium, and a signal transmission method and in particular, to a digital signal coding method and apparatus, a signal recording medium, and a signal transmission method which can preferably be applied for a case of recording a moving picture signal and an acoustic signal on a recording medium such as a magneto-optical disc and a magnetic tape and reproducing the signals to be displayed on a display or for a video conference system or a broadcast apparatus for transmitting a moving picture signal and an acoustic signal from a transmission side to a reception side via a transmission path, so that the signals are received and displayed at the reception side.

2. Description of the Prior Art

A digital signal obtained by digitizing a moving picture signal, an acoustic signal, or the like has a plenty of information amount. Consequently, when recording the digital signal on a recording medium having a small storage information amount for a long period of time, or when transmitting the digital signal through a limited communication path with a plenty of channels, it is indispensable to provide means for coding the digital signal with a high efficiency. In order to answer such a requirement, there have been suggested high-efficiency coding methods using a correlation of a video signal. One of the methods is the MPEG method or MPEG specification. The MPEG (Moving Picture Image Coding Experts Group) was discussed and proposed as a standard plan in the ISO-IEC/HTC1/SC2/WG11. The MPEG specification is a hybrid method using a motion compensative predictive coding and a discrete cosine transform (DCT) in combination. In this MPEG method, firstly a video signal difference between frames is determined so as to remove a redundancy in the time axis direction and the discrete cosine transform is used to remove a redundancy in the spatial axis direction, thus enabling to encode a video signal with a high efficiency.

The MPEG specification consists of three parts: the MPEG video (ISO/IEC11172-2 or ISO/IEC13818-2) for a high-efficiency coding of a video signal; the MPEG audio (ISO/IEC11172-3 or ISO.IEC13818-3) for a high-efficiency coding of an audio signal; and the MPEG system (ISO/IEC11172-1 or ISO/IEC13818-1) for multiplexing compressed video and audio bit streams into a single bit stream and reproducing the stream with synchronization.

FIG. 1 is a block diagram showing a configuration example of a digital signal coding apparatus of a conventional MPEG method. Here, a feed forward control is carried out for determining an assignment (target) bit amount for each of input pictures when coding an input video signal. That is, a video signal S101 inputted from a terminal 200 is supplied to a frame memory 201. The frame memory 201 is capable of storing a predetermined length of an input video signal. Here, the predetermined time length is, for example, 0.5 seconds (15 frames in the case of NTSC). An image coding controller 202 reads a video signal S111 from the frame memory 201 and, for coding each of the pictures, calculates an assignment bit amount S112 and a picture coding parameter S117. More specifically, an assignment bit amount for a predetermined time length of a video signal is optimally distributed according to the images of the respective pictures. A video encoder 203 encodes a picture S102 supplied from the frame memory 201 according to the coding parameter S117, so that the picture S102 has the assignment bit amount S112 supplied from the image coding controller 202, and outputs a coded bit stream S103 of the picture S102 and a generated coding bit amount S113. The coded bit stream S103 is supplied to a buffer 204 and to an access unit detector 201. Moreover, the generated coding bit amount S113 outputted from the video encoder 203 is supplied to the image coding controller 202. In the image coding controller 202, if the generated bit amount is greater than the assignment bit amount, control is made so as to make the next assignment bit amount smaller; and if the generated bit amount is smaller than the assignment bit amount, control is made so as to make the next assignment bit amount greater.

An audio signal S105 inputted from a terminal 205 is supplied to an audio encoder 206. The audio encoder 206 encodes the input audio signal S105 on audio frame basis by way of the MPEG audio method and outputs a coded bit stream S106 to a buffer 207 and to the access unit detector 211. Here, one audio frame consists of 1152 samples in the case of the MPEG audio layer 2.

A sub picture signal S108 such as a superimpose information inputted from a terminal 208 is supplied to a sub picture encoder 209. The sub picture encoder 209 encodes each sub picture by way of the Run Length method, for example, and outputs a coded bit stream S109 obtained to a buffer 210 and to the access unit detector 211.

The access unit detector 211 detects a coding bit amount, a decoding time information, and a display time information of an access unit (decoding unit) of the video, audio, and sub picture coded bit streams and outputs the obtained information as an access unit information S114. Here, the access unit is one picture of a video signal, one frame of an audio signal, and one picture of a sub picture signal.

The video bit stream, the audio bit stream, and the sub picture bit stream are time-division multiplexed by the MPEG system method. The bit streams which have been multiplexed by the MPEG system method is formatted, for example, as shown in FIG. 2. In this FIG. 2, V, A, S respectively represent a video bit stream packet, an audio bit stream packet, and a sub picture bit stream packet. A packet has a configuration having a header information consisting of a decoding time information, display time information, and the like which is followed by a coded bit stream.

A multiplex scheduler 212, according to the access unit information S114, determines a schedule information S115 for time-division multiplexing the video, the audio, and the sub picture coded bit streams.

That is, the MPEG system method defines a system target decoder (STD) which is a virtual decoder model as shown in FIG. 3, and the multiplexed bit stream should be encoded while maintaining this system target decoder. This system target decoder (STD) shown in FIG. 3 will be detailed below.

In FIG. 3, a multiplexed bit stream is inputted from a terminal 301, and a switch 302, from this stream, isolates a video bit stream packet, an audio bit stream packet, and a sub picture bit stream packet, which packets are respectively supplied to a buffer 303, a buffer 305, and a buffer 307. A video decoder 304, an audio decoder 306, and a sub picture decoder 308 read out an access unit from respective buffers according to the decoding time information of the access unit of the coded bit streams stored in the respective buffers, and decode the access unit, so as to reproduce with synchronization the video, the audio, and the sub picture according to the display time information of the access unit. Here, the multiplexed bit stream should be coded so as to maintain the system target decoder, preventing overflow and underflow of the buffer 303, the buffer 305, and the buffer 307. The buffer overflow means that a bit stream storage amount exceeds a buffer capacity; and the buffer underflow means that an access unit is not entirely stored in the buffer by the decoding time of the access unit.

FIG. 4 shows a transition of a bit occupation in the STD buffer. In this FIG. 4, B represents a size of the STD buffer, and the vertical axis represents the buffer bit occupation amount or a data amount. A data input to the STD buffer is carried out with an input rate indicated by the inclination of the straight line ascending rightward, which increases the bit occupation amount. Moreover, in this figure, each of the access units A is instantaneously removed from the STD buffer at a corresponding decoding time DTS (decoding time stamp), which decreases the buffer bit occupation amount. The trace of the STD buffer bit occupation amount should be within the buffer size B.

The multiplex scheduler 212 of FIG. 1 determines a multiplex schedule of the video, audio, and sub picture coded bit streams, so as to prevent destruction of the system target decoder (STD), and outputs the information S115 to a multiplexer 213. That is, the multiplex scheduler 212 simulates the STD buffer bit occupation amount and determines the multiplex scheduler so as to prevent the buffer overflow and underflow. The mutliplexer 213, according to a mutliplex schedule information S115, reads out bit streams S104, S107, and S110 from the buffer 204, buffer 207, and buffer 210, respectively, and multiplexes the bit streams by way of time division, so as to output a multiplexed stream S116.

In the MPEG video method, it is possible to change a generated bit amount for each picture as well as a video coding bit rate and accordingly, the packet cycle of the video, audio, and sub picture in the multiplexed bit stream is not always constant. Generally, when determining a multiplex schedule of a current video packet, i.e., when establishing an input schedule of a current coding picture (access unit) to the system target decoder (STD), consideration is also taken on an information of a coding picture to be inputted to the system target decoder in future, which enables to obtain a save control.

That is, in FIG. 4, for example, in order to determine a video input schedule (input rate) to the STD buffer in a time window from the DTS[n−1] to DTS[n], it is preferable to consider an information A[n] of coding of a current picture and an information of coding of several frames in future A[n+1], A[n+2] ... DTS[n+1], DTS[n+2] ... That is, in this case, by considering not only the multiplex schedule of the time window DTS[n−1] to DTS[n] but also a multiplex schedule of the future, it is possible to secure a safe coding of a multiplexed stream.

For this, it is necessary to store a plurality of coded pictures (access units) in the buffer 204 and between the signals S103 and S104 there is often a delay amount corresponding to several frames required for determining the multiplex schedule.

FIG. 5 shows an example of a timing chart of a video signal processing in the digital signal coding apparatus of FIG. 1. Here, P1 to P10 represent pictures or their picture information. In this example, it is assumed that the feed forward control for determining an assignment coding bit amount for coding an input video is carried out to first five pictures in the future including a current picture. That is, in the frame memory 201, the input video signal S101 is delayed by a 5-picture time. Moreover, it is assumed that in order to determine a multiplex schedule of a current coding picture, a coding information on the first 5 pictures including a current picture is considered. That is, in the buffer 204, a delay of 5-picture time is required.

Here, as shown in FIG. 5, for the input video signal S101, the assignment coding bit amount S112 is delayed by 5-picture time. If it is assumed to ignore a delay amount in the encoder 203, the S11, the input picture S102 to the encoder 203, and the coded picture S103 are synchronized. Next, for the coded picture S103, the multiplex schedule information S115 is delayed by a 5-picture time. If it is assumed to ignore a delay in the multiplexer 213, the S115, the coded picture S104 which is read out from the buffer 204, and the multiplexed output S116 are synchronized.

Now, in the conventional digital signal coding apparatus of FIG. 1, the delay amount of the multiplexed bit stream S116 for the input video signal S101 mainly consists of a delay amount in the frame e memory 201 for calculating the assignment coding bit amount of a picture and a delay amount in the buffer 204 for the multiplex schedule calculation.

Generally, as the delay amount in the frame memory 201 fro calculation of the assignment coding bit amount increases, it is possible to drastically change the assignment coding bit amount of an input picture, enabling to obtain a coded picture of a high quality. However, this is accompanied by a greater delay amount in the buffer 203 for the multiplex schedule calculation, requiring a grater size (bit amount) of the buffer 204.

For this, conventionally, when it is desired to decrease the delay amount of the multiplexed bit stream S116 for the input video signal S101, the delay amount in the frame memory 201 or in the buffer 204 has been made small. However, if the delay amount in the frame memory 201 is made small, there arises a problem that the coded picture quality is deteriorated. Moreover, if the delay amount in the buffer 204 is made small, there arises a problem that it becomes difficult to establish a safe multiplex schedule.

SUMMARY OF THE INVENTION

It is therefore an object of the present invention to provide a digital coding method and apparatus, a signal recording medium, and a signal transmission method which enable to reduce a delay amount of an output multiplexed bit stream with respect to an input digital signal in comparison to a conventional digital signal coding apparatus as well as to obtain a coded picture of a high quality and to establish with safety a multiplex schedule for multiplexing coded bit streams.

In order to achieve the aforementioned object, the present invention is characterized in that when coding an input digital signal such as a video signal and an audio signal and multiplexing coded bit streams into a single bit stream, a coding control information for coding the input digital signal of a predetermined unit interval is adaptively determined and a multiplex schedule is controlled according to this control information, for multiplexing the coded bit stream.

Here, the coding control information includes an assignment coding bit amount and if the input digital signal is a video signal, the unit interval is a picture.

Because the multiplex schedule control is based not on an information such as a coding bit amount of an already coded signal but on the coding control information for coding, it is possible to reduce a memory capacity of a buffer which stores a coded signal.

BRIEF DESCRIPTION OF THE DRAWINGS

FIG. 7 shows relationships of the picture coding parameters picture_coding_type, repeat _first _field with the DTS, PTS.

FIG. 8 shows an example a program for DTS and PTS calculation by using picture coding parameters picture_coding_type, repeat_first_field, and top_field_first.

DETAILED DESCRIPTION OF PREFERRED EMBODIMENTS

Hereinafter, description will be directed to a digital signal coding method and apparatus, a signal recording medium, and a signal transmission method according to preferred embodiments of the present invention.

Figure 1:
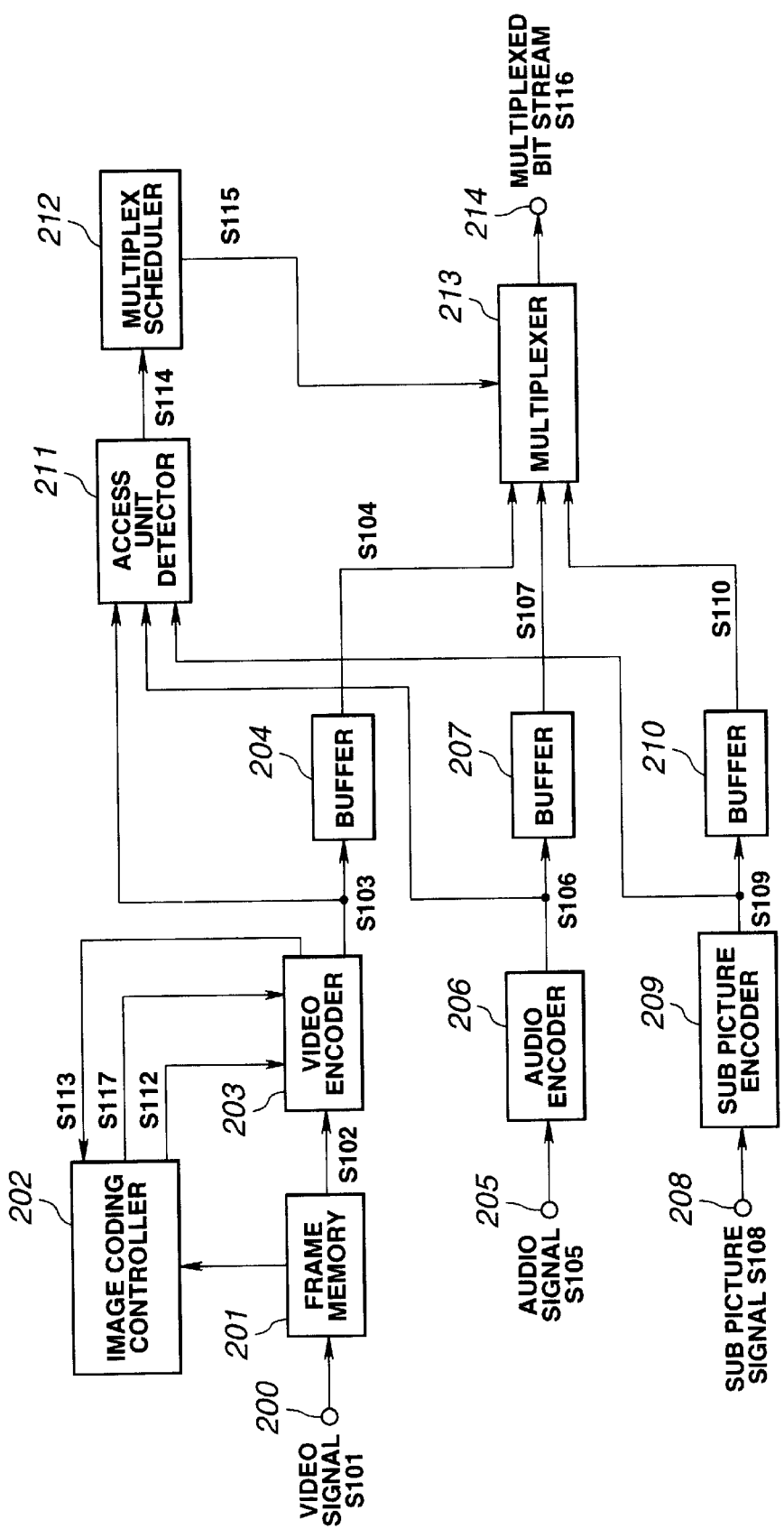
FIG. 1 is a block diagram showing a configuration example of a conventional digital signal coding apparatus.
Figure 2:
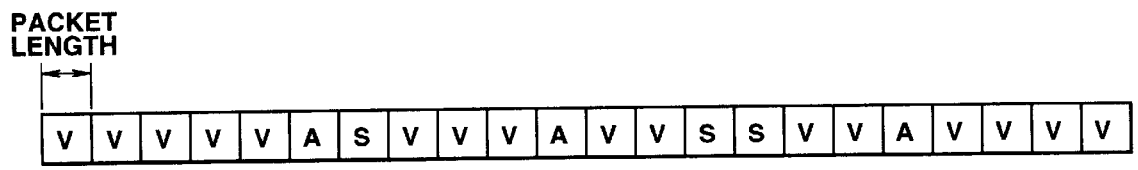
FIG. 2 shows a multiplex bit stream format when a video bit stream, an audio bit stream, and a sub picture bit stream are time-division multiplexed by the MPEG system method.
Figure 3:
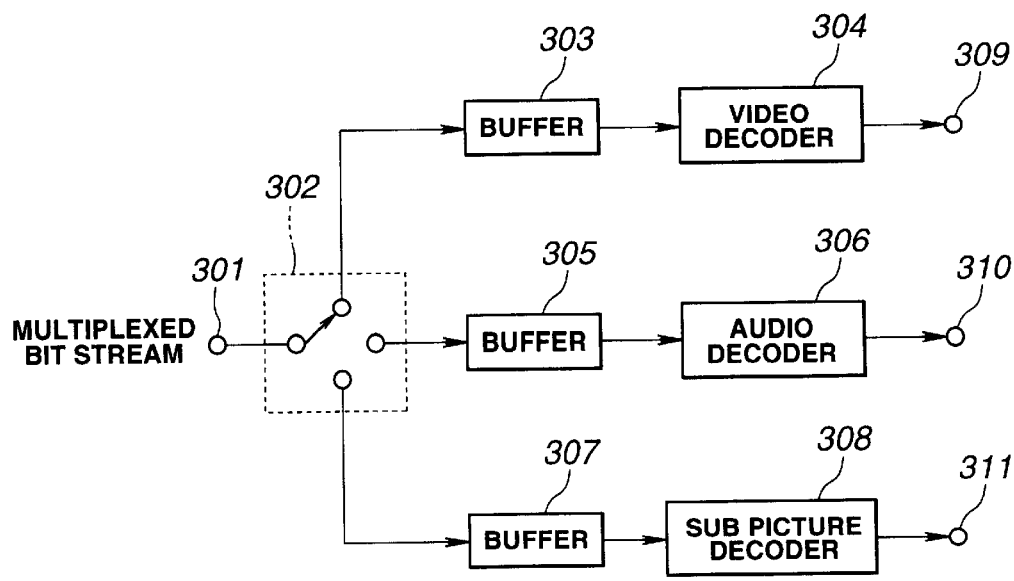
FIG. 3 is a block diagram showing a configuration example of a system target decoder defined in the MPEG system method.
Figure 6:
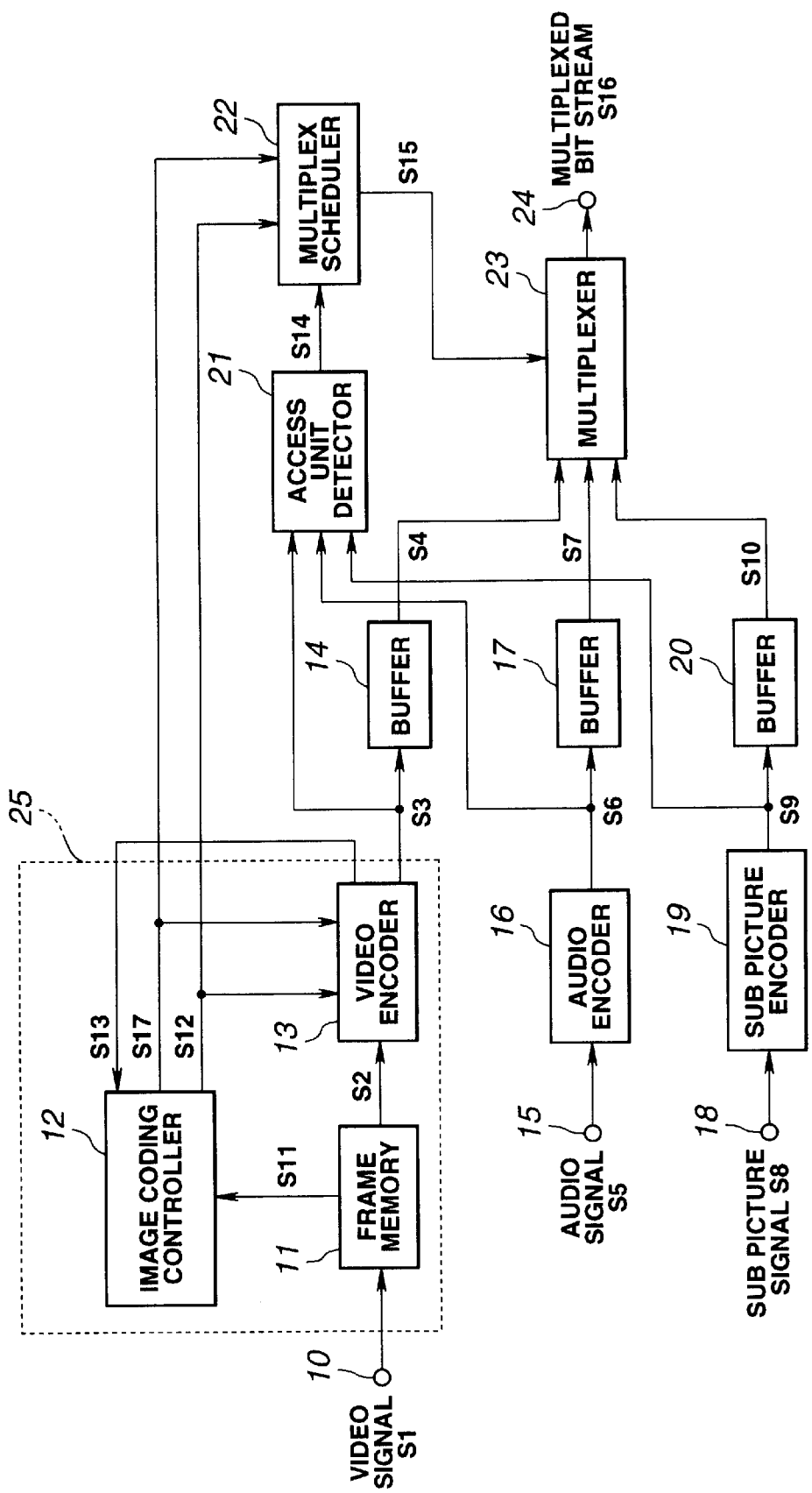
FIG. 6 is a block diagram showing a configuration example of a digital signal coding apparatus according to an embodiment of the present invention.

FIG. 6 is a block diagram showing a configuration example of a digital signal coding apparatus which employs the digital signal coding method according to an embodiment of the present invention. In this embodiment, unlike the conventional digital signal coding apparatus of the aforementioned FIG. 1, an image coding controller 12 supplies an assignment coding bit amount information S12 of a picture and a coding parameter S17 of a picture to a multiplex scheduler 22, so that the multiplex scheduler 22 establishes a multiplex schedule by using the aforementioned assignment bit amount information S12 and the coding parameter S17.

In the embodiment shown in FIG. 6, a video signal S1 inputted from a terminal 10 is supplied to a frame memory 11. The frame memory 11 can store a predetermined tie length of an input video signal. Here, the predetermined time length, for example, is 0.5 seconds (15 frames in the case of NTSC). The image coding controller 12 reads in a video signal S11 from the frame memory 11 and calculates the assignment bit amount S12 for coding respective pictures and coding parameter S17 of the picture. More specifically, an assignment bit amount for a predetermined time length of a video signal is optimally distributed according to images in the respective pictures. Moreover, as the picture coding parameter, there can be exemplified picture_coding_type, repeat_first_field, and top_field_first_defined in the MPEG video specification.

The aforementioned picture_coding_type_which is one of the coding parameters S17 has three types of picture: I picture, P picture, and B picture. The I picture is an intra-coding picture which is coded independently of the other pictures. The P picture is a forward predictive coding picture and coded through prediction from an I picture or a P picture which is positioned temporally in the past. The B picture is a bi-directional predictive coding picture which is coded through prediction by using an I or P picture preceding and following temporally, in the forward direction, backward direction, or two directions. The top_field_first is a parameter indicating which of top_field and bottom_field is to be displayed when a picture is in a frame configuration at the reception (decoder) side. The repeat_first_field is a parameter indicating whether to repeatedly display the field first displayed when the picture is in a frame configuration at the reception (decoder) side.

A video encoder 13 encodes a picture S2 supplied from the frame memory 11 according to the coding parameter S17 by way of the MPEG video method, so as to correspond to the assignment coding bit amount S12 supplied from the image coding controller 12, and outputs a coded bit stream S3 of the picture S2 and a generated coding bit amount S13. The coded bit stream S3 is supplied to a buffer 14 and to an access unit detector 21. Moreover, the video encoder 13 outputs a generated coding bit amount S13 which is supplied to the image coding controller 12. In the image coding controller 12, if the generated bit amount is greater than the assignment bit amount, a control is made to make the next assignment bit amount smaller, and if the generated bit amount is smaller than the assignment bit amount, control is made to make the next assignment bit amount greater.

The frame memory 11, the image coding controller 12, and the video encoder 13 constitute a moving picture signal coding block 25. A specific example of this moving picture coding block 24 will be detailed later with reference to FIG. 11.

In FIG. 6, an audio signal S5 inputted from a terminal 15 is supplied to an audio encoder 16. The audio encoder 16 encodes the input audio signal S5 on frame basis by way of the MPEG audio method and outputs a coded bit stream S6 to a buffer 17 and to the access unit detector 21. Here, one audio frame corresponds to 1152 samples in the case of MPEG audio layer 2.

A sub picture signal S8 such as a superimpose information inputted from a terminal 18 is supplied to a sub picture encoder 19. The sub picture encoder 19 encodes each of the sub pictures by way of Run Length method, for example, and outputs its coded bit stream S9 to a buffer 20 and to the access unit detector 21.

The access unit detector 21 calculates each of the video, audio, and sub picture coded bit streams: a coding bit amount, a decoding time information (DTS: decoding time stamp), and a display time information (PTS: presentation time stamp) of an access unit (decoding time) and outputs the obtained information as an access unit information S14. Here, the access unit is one picture of a video signal, one frame of an audio signal, and one sub picture of a sub picture signal.

Next, FIG. 7 shows relationships between the picture_coding_type_, repeat_first_field and DTS, PTS.

Hereinafter, explanation will be given on respective signals A to I in FIG. 7.

[A] moving picture input: The letter "F" of the upper case represents a top field of an interlace video, and the letter "f" of lower case represents a bottom field of the interlace video. Here, an input signal is a video signal of a film image pulled down by 3-2. A pair of F and f having an identical subscript numeric corresponds to one frame of a film.

[B] frame_input: A pair of top field and bottom field having an identical subscript starting at a field at a time moment when "1" is set constitutes a frame to be encoded. When coding a video signal which has been pulled down by 3-2, a frame is created by removing a repeated field. For example, the fifth field F1 of A is a repetition of the third field F1 and accordingly excluded and not encoded.

[C] repeat _first_field: "1" if top field at the timing when frame_input_becomes "1"; and "0" if bottom field at the timing when frame_input_becomes "1".

[D] repeat_first_field: Becomes "1" when a repeated field by the 3-2 pull down is excluded while creating a frame to be encoded.

[E] picture_coding_type: The letters I, P, and B respectively correspond to an I picture, P picture, and B picture; and the subscript numeric correspond to the respective subscripts of A.

[F] encoding time: I and P pictures which are positioned temporally later are encoded prior to a B picture and there order is changed as shown in the figure.

[G] decoding time (DTS): The decoding order is identical to the encoding order. Here, it is assumed that encoding is carried out simultaneously with decoding.

[H] display time (PTS): An image output is carried out in the original order. The B picture can be displayed immediately after decoded.

[I] moving picture output: Pictures are displayed according to the top_field_first and the repeat_first_field .

Here, FIG. 8 shows a C language program as a specific example of algorithm for calculating the DTS and PTS by using the aforementioned picture coding parameters picture_coding_type, repeat_first_field, and top_field_first. That is, the DTS and PTS of each of the pictures inputted in the encoding time order of FIG. 7F are calculated. In this FIG. 8, the DTSO is a value related to the top_field_first_of the first picture B0. The I2 decoding time is set so that B0 can be executed immediately after B0 is decoded from the field parity time indicated by top_field_first by TS=DTSO in the program.

Back to FIG. 6 again, the multiplex scheduler 22 is supplied with the current access unit information S14 and information on a future access unit (picture), i.e., the assignment coding bit amount information S12 and the coding parameter S17. Thus, when establishing a multiplex schedule of a current access unit (coded picture), it is possible to consider a bit amount and an assignment parameter of a future access unit (coded picture) to be inputted in future. The multiplex scheduler 22 establishes a multiplex schedule for time-division multiplexing the audio and sub picture coded bit streams, so as to prevent destruction of the system target decoder, and outputs the obtained information S15 to a multiplexer 23.

The multiplexer 23, according to the multiplex schedule information S15, reads out the bit streams S4, S7, and S10 from the buffer 14, buffer 17, and buffer 20, respectively, and multiplex them by time division, so as to output a multiplexed stream S16 from a terminal 24. The multiplexed bit stream obtained from this output terminal 24, if necessary, is added with an error correction code and a synchronous signal, or subjected to a predetermined modulation processing for transmission or recording, and transmitted via a transmission path or a communication path, or recorded on a signal recording medium such as an optical disc, magnetic disc, magnetic tape, or the like.

Figure 5:
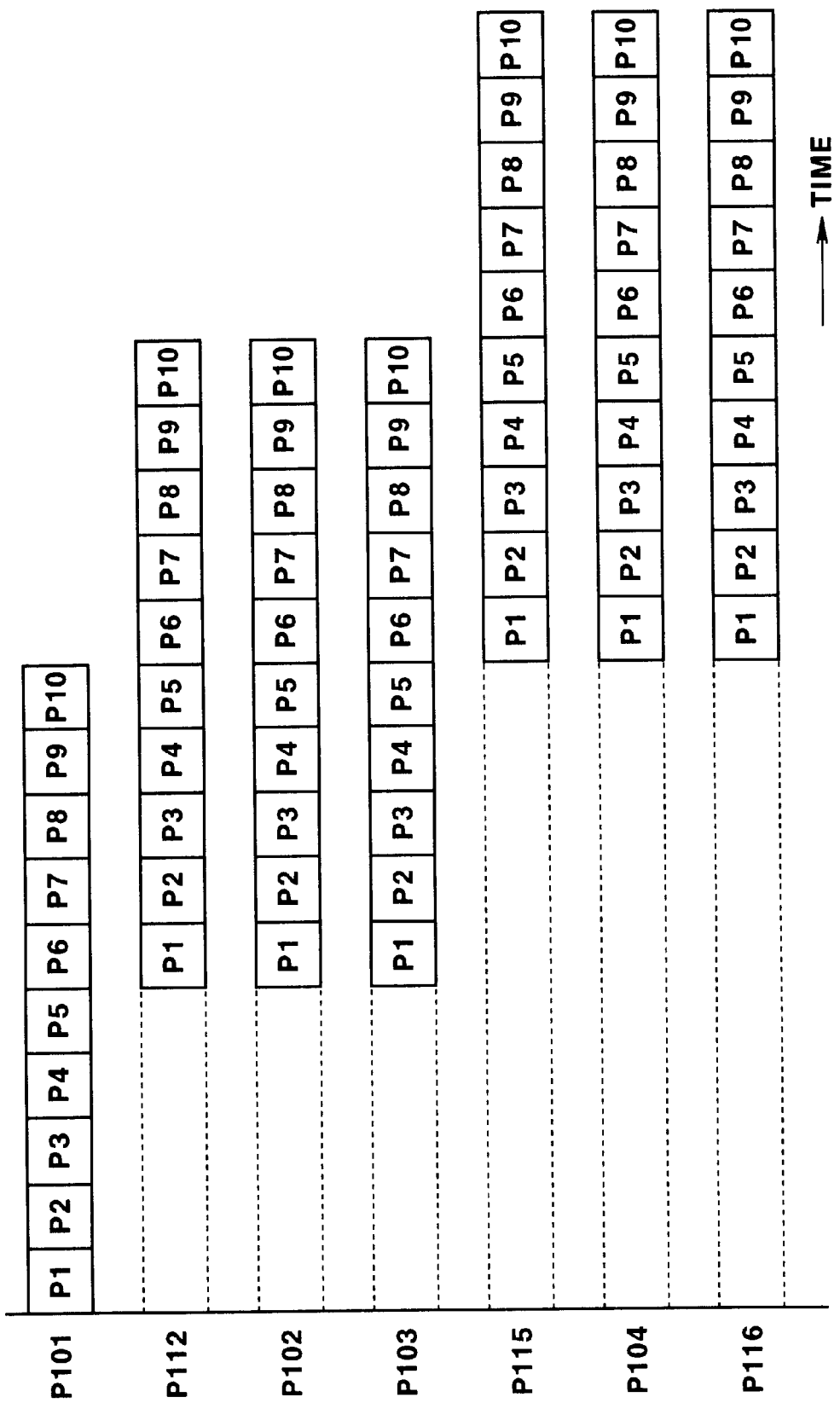
FIG. 5 shows an example of a timing chart of a video signal processing in the digital signal coding apparatus of FIG. 1.
Figure 9:
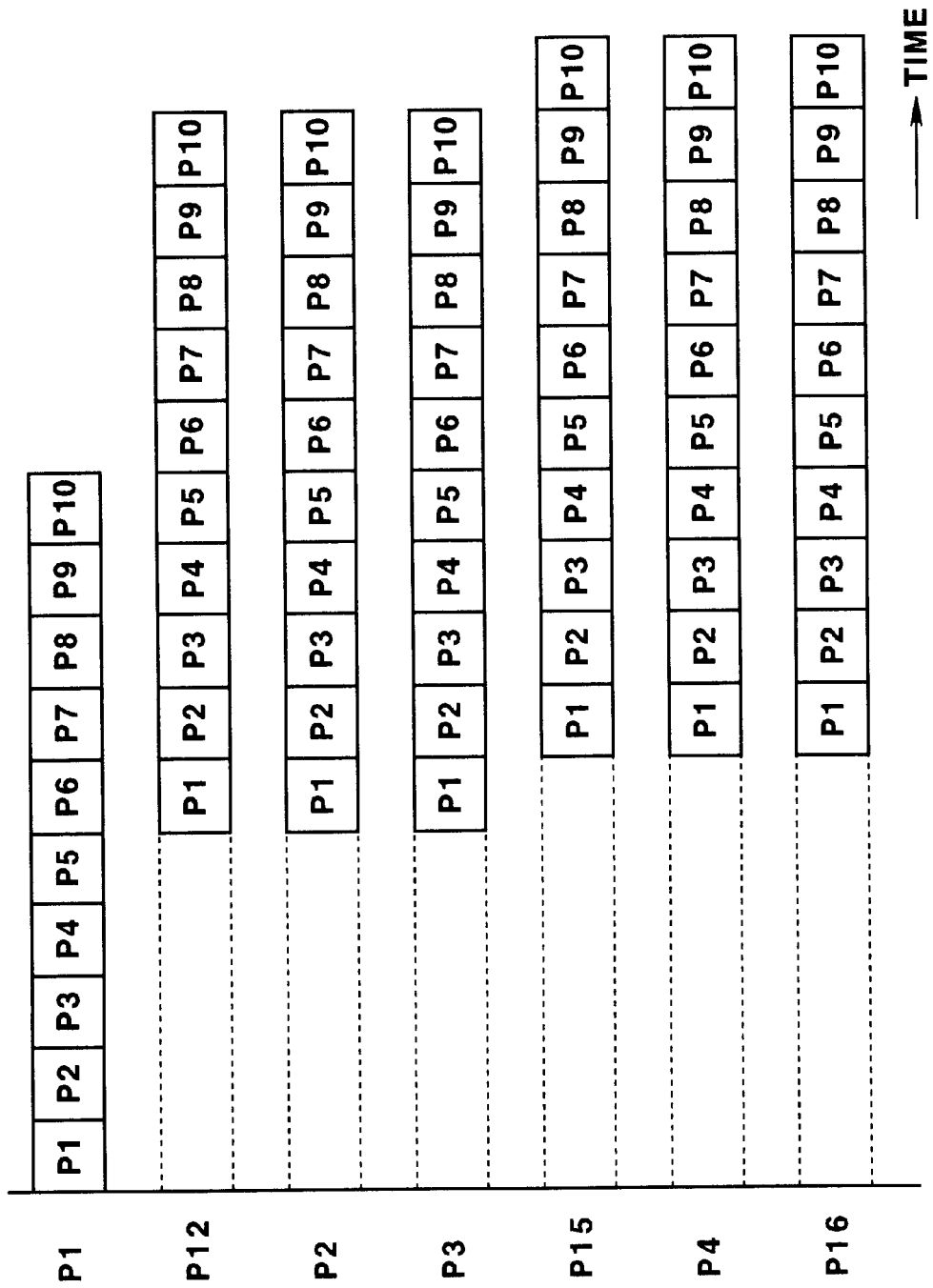
FIG. 9 shows an example of a timing chart of a video signal processing in the digital signal coding apparatus of FIG. 6.

FIG. 9 shows an example of a timing chart of a video signal processing in the digital signal coding apparatus of FIG. 6. Here, P1 to P10 represent pictures or their information. Like the aforementioned conventional example of FIG. 5 explained above, it is assumed that the first five future pictures including a current picture are subjected to the feed forward control for determining the assignment bit amount of each of the input pictures when coding an input video signal. That is, in the frame memory 11, the input video signal S1 is delayed by five pictures. Moreover, it is assumed that in order to determine the multiplex schedule of a current coding picture, consideration is taken on coding information of the first five future pictures including a current picture.

That is, the multiplex scheduler 22 reads in the current coded picture bit amount S14 detected in the access unit detector 21, and further the assignment coding bit amount S12 and the coding parameter S17 of the four future pictures, so that the multiplex schedule can be determined according to the S14, S12, and S17. Consequently, the delay amount required in the buffer 14 is only one-picture time, which significantly reduces the delay amount required for multiplexing in comparison to the conventional method.

Here, as shown in FIG. 9, for the input video signal S1, the assignment coding bit amount S12 of the picture is delayed by a five-picture time. If the delay amount in the encoder 13 is assumed to be ignored, the S12, the input picture S2 to the encoder 13, and the coded picture S3 are synchronized. Next, for the coded picture S3, the multiplex schedule information S15 is delayed by one-picture time. If the delay in the multiplexer 23 is assumed to be ignored, the S15, the coded picture S4 which is read out fro the buffer 14, and the multiplexed output S16 are synchronized.

Figure 10:
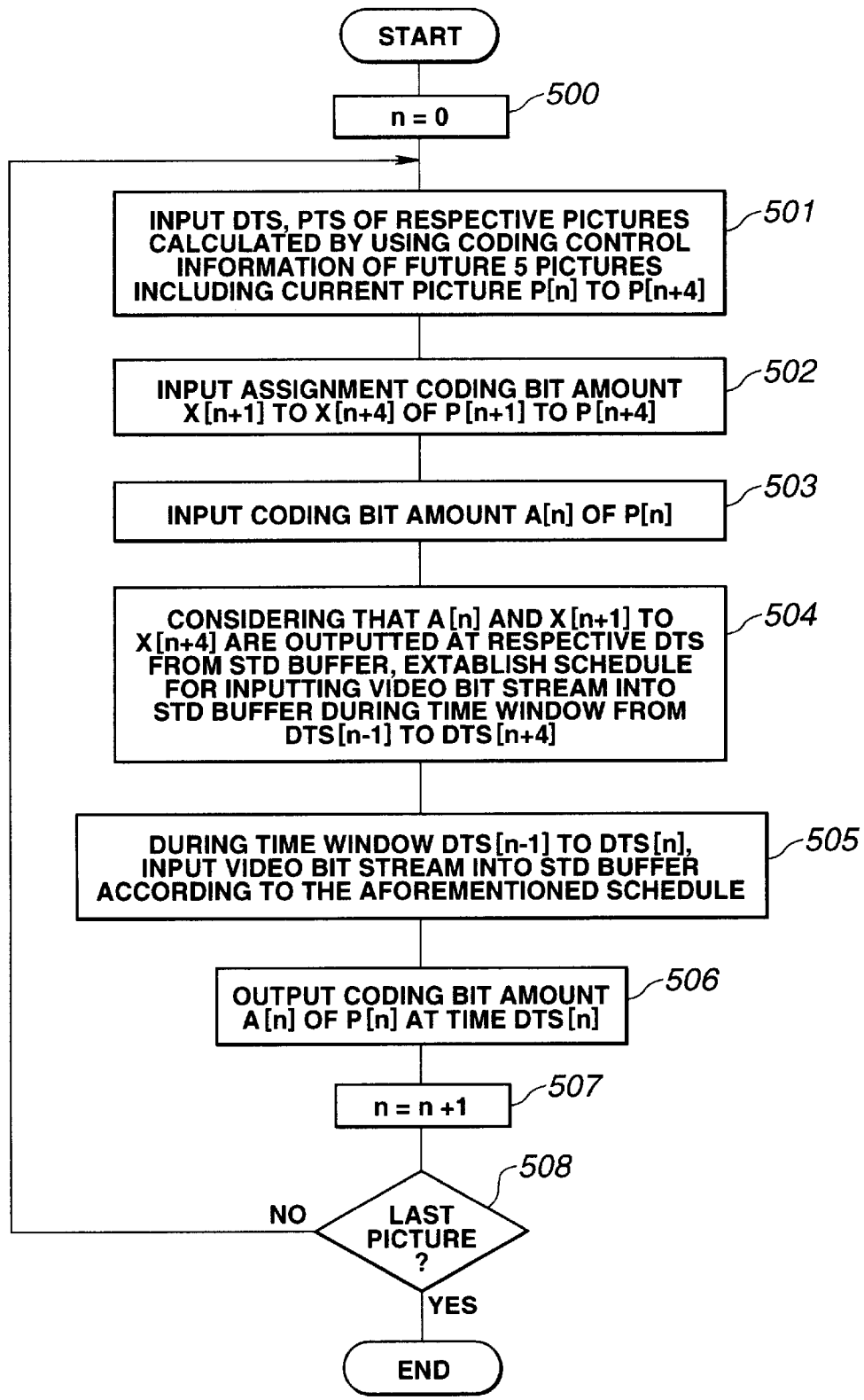
FIG. 10 is a flowchart for explaining an example of algorithm for establishing a video signal multiplexing schedule.

FIG. 10 is a flowchart for explaining a specific example of algorithm for establishing a video multiplexing schedule.

In this FIG. 10, in the first step 500, a processing of the first picture is started, Here, "n" represents a picture input number after the order change into the encoding sequence. In the next step 501, the coding control information of the future five frames (five pictures) including the current frame P[n] to P[n+4], i.e., picture_coding_type, repeat_first_field and top_field_first, are used to input the DTS and PTS of each picture calculated in the access unit detector 21, i.e., DTS[n] to DTS[n+4] and PTS[n] to PTS[n+4]. The next step 502 inputs the assignment coding bit amount X[n+1] to X[n+4] of the future four pictures P[n+1] to P[n+4] supplied from the image coding controller 12. The next step 503 inputs the coding bit amount A[n] of the current picture P[n] calculated in the access unit detector 21.

Next, in step 504, considering that the coding bit amount A[n] of the current picture P[n] and the assignment bit amounts X[n+1] to X[n+4] of the future four pictures P[n+1] to P[n+4] are outputted from the STD buffer at the respective DTS, a schedule is established to input a video bit stream to the STD buffer in the time window from DTS[n−1] to DTS[n+4] without destroying the STD buffer. It should be noted that the DTS[−1] when n=0 is a time in the past by a predetermined start up delay amount from the DTS[0].

Figure 4:
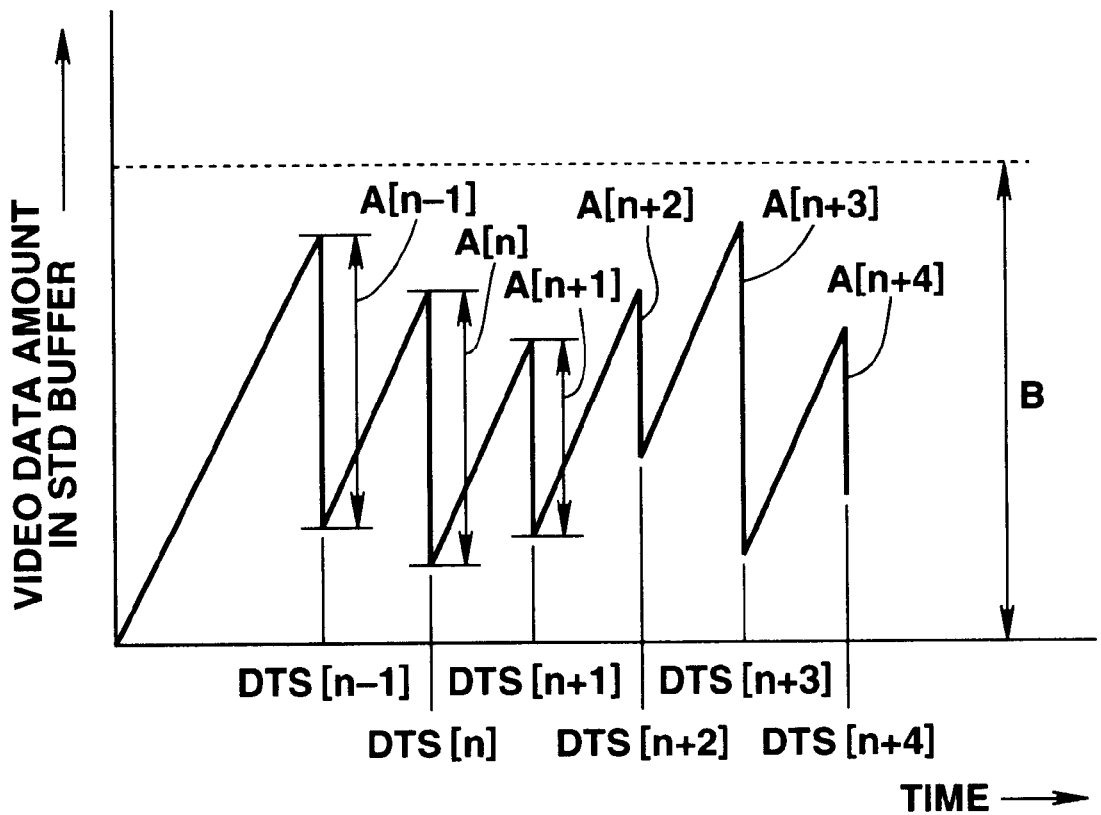
FIG. 4 shows a transition of a bit occupation ratio of a video STD buffer.

As has been explained with reference to FIG. 4, in the conventional method, for example, when establishing an input schedule (input rate) for input of the video of the time window DTS[n−1] to DTS[n+4] to the STD buffer, it has been necessary to obtain an information on the picture coding bit amounts A[n] to A[n+4], which in turn requires a 5-picture delay time from the picture encoding to the multiplexing. In contrast to this, in the aforementioned algorithm, a similar multiplex schedule can be established by using the A[n] and the assignment bit amounts of future pictures X[n+1] to X[n+4], which requires only one-picture delay time from the picture encoding to its multiplexing.

Next, in step 505, during the time window DTS[n−1] to DTS[n], the video bit stream is inputted to the STD buffer according to the aforementioned schedule. This schedule information is supplied as the multiplex schedule information S15 in FIG. 6 to the multiplexer 23, and the multiplexer 23 encodes the multiplex stream. In the next step 506, the assignment bit amount A[n] of P[n] is outputted at time DTS[n] from the STD buffer. In the next step 507, the "n" is incremented and control is passed to a processing of the next picture. That is, in step 508, if the processing of up to the last picture is complete, the processing is terminated. Otherwise, control is returned to step 501.

Figure 11:
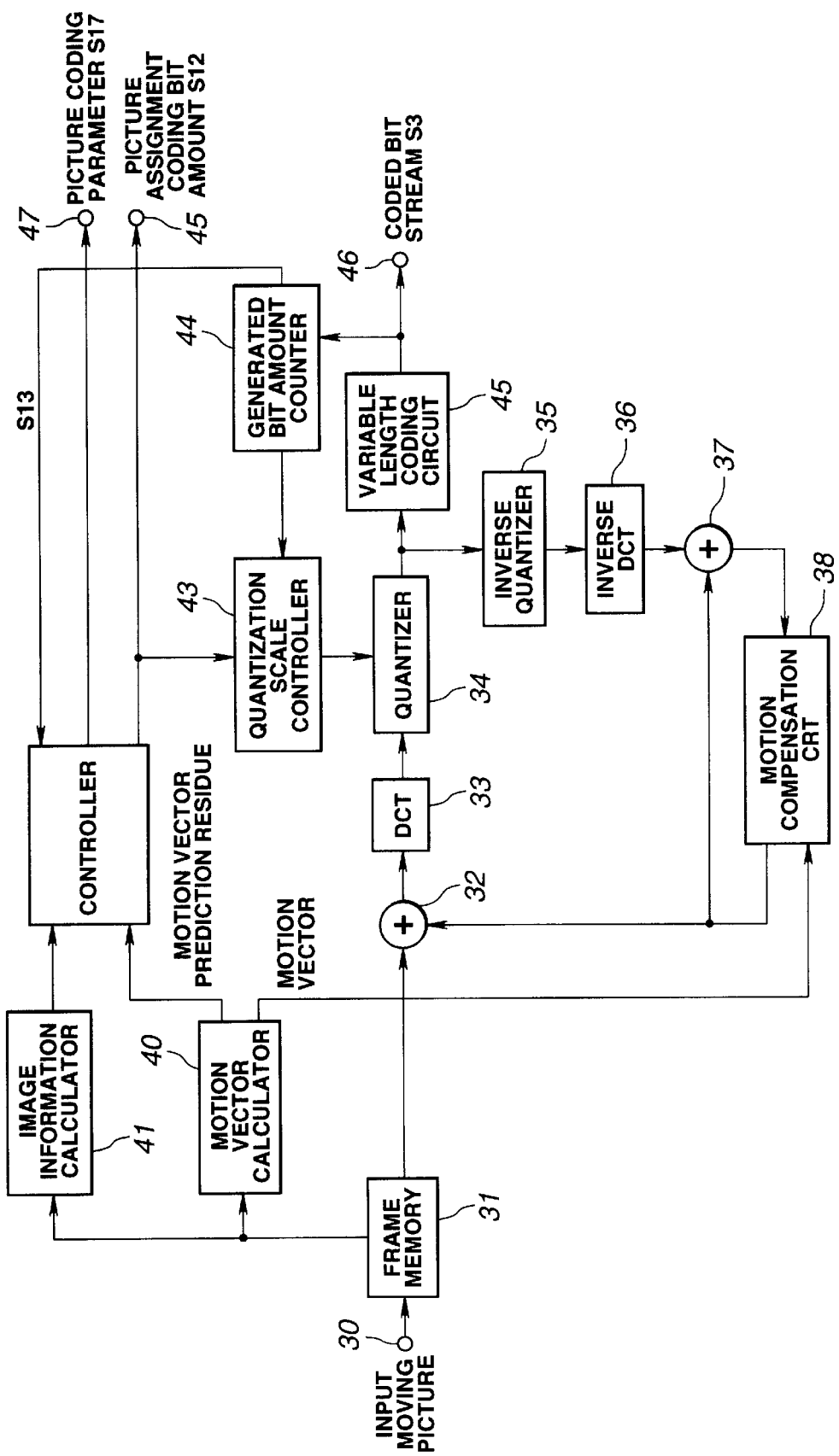
FIG. 11 is a block diagram showing a configuration example of a moving picture signal coding block 25 in the digital signal coding apparatus of FIG. 6.

FIG. 11 is a block diagram showing a configuration example of the moving picture signal coding block 25 of the digital signal coding apparatus of FIG. 6. That is, the terminal 10 and the frame memory 11 of FIG. 6 correspond to the a terminal 30 and a frame memory 31 of FIG. 11, respectively. The image coding controller 12 of FIG. 6 almost corresponds to a motion vector calculator 40, an image information calculator 41, and a controller 42 of FIG. 11. The video encoder 13 of FIG. 6 almost corresponds to the remaining circuit portion of FIG. 11.

A moving picture signal inputted from the terminal 3o of this FIG. 11 is supplied to the frame memory 31. For example, in the case of FIG. 9 as an example, the frame memory 31 has a capacity for five pictures. The motion vector calculator 40 reads out the moving picture signal from the frame memory 31 and calculates its motion vector and its prediction residue for output. The motion vector χαλχυλατορ 40 calculates a motion vector on the so-called MPEG macro block (MB: 16×16pixels) basis. A motion vector detection is carried out by way of pattern matching between a reference frame and a current macro block. That is, as shown in an Expression (1) given below, a sum Ef of absolute values of differences between the current macro block signal A [i, j] and a macro block signal F [x+i, y+j] referenced by an arbitrary motion vector (x, y) is obtained.

$$Ef = \Sigma \, |A \, [i, j] - F \, [x+i, y+j]| \quad (i=0 \text{ to } 15, j=0 \text{ to } 15) \quad (1)$$

The motion vector calculator 40 of FIG. 11 uses the coordinates (x, y) which minimize the aforementioned Ef as a motion vector of the current macro block and outputs the Ef as a prediction residue of the motion vector.

The image information calculator 41 reads out a moving picture signal from the frame memory 31 and calculates a statistical value indicating remarkability of the coding deterioration. This statistical value is determined by calculating a parameter representing an image flatness such as a macro block luminance signal distribution value.

The controller 42 outputs picture_coding_type, top_field_first, and repeat_first_field as the picture coding parameters S17. The picture_coding_type is, for example, a sum of prediction residues of the motion vector within a picture. That is, a change of a sum D of the Ef calculated by the aforementioned Equation (1) from picture to picture is observed so that if the change ratio is greater than a predetermined threshold value, it is decided that there is a scene change, and the picture at the scene change is specified to be coded by the Intra picture of MPEG.

Moreover, the controller 42 calculates the assignment coding bit amount S12 of a picture according to the motion vector prediction residue supplied from the motion vector calculator 40 and the statistical value supplied from the image information calculator 41. The assignment coding bit amount of the picture is calculated as follows. The controller 42 calculates a total D of the macro block motion vector prediction residues within the picture and modifies the obtained value with a parameter α indicating the coding deterioration remarkability, so as to obtain a picture coding difficulty d as follows:

$$d = D \times \alpha$$

In general, for the human eye, the coding noise is more remarkable at a flat portion of an image and less remarkable at a complicated portion of an image. Based on this principle, as the image dispersion value increases, the value α is made smaller, and as the dispersion value decreases, the value α is made greater. It should be noted that when an input image is subjected to Intra coding according to an image coding mode (not depicted), it is preferable to use as the aforementioned value D, a within-picture total of dispersion values of the macro block signal calculated in the image information calculator 41. The controller 42, for example calculates a coding difficulty for five future pictures including the current picture and distributes the assignment bit amount given to the 5-picture time according to the coding difficulty of the respective pictures.

A motion compensation circuit 38 is provided with a frame memory and reads out a prediction macro block signal from the image memory according to a motion vector. A calculator 32 carries out an addition processing by using as an addition signal the input macro block signal from the frame memory 31 and as a subtraction signal the aforementioned prediction macro block signal from the motion compensation circuit 38, so as to calculate a difference between the input macro o block signal and the prediction macro block signal, and output the obtained difference as a prediction residue macro block signal. It should be noted that in a case when an input picture is coded as an I picture by specification of picture_coding_type, the input macro block signal is outputted as it is from the calculator 32 without carrying out prediction. The aforementioned prediction residue macro block signal (or the input macro block signal if no prediction is executed) is fed to a DCT circuit 33. In this DCT circuit 33, the aforementioned prediction residue a macro block signal is subjected to a two-dimensional DCT.

A quantization scale controller 43 outputs a quantization step to a quantizer 34, so that the generated coding bit amount of the current picture is equal to the assignment coding bit amount specified from the controller 42. A DCT coefficient outputted from the DCT circuit is supplied to the quantization circuit 34, so as to be quantized with a quantization scale specified by the quantization scale controller 43. The quantization circuit 34 outputs a quantized output signal which is transmitted to a variable length coding circuit 39 and to a reverse quantization circuit 35. The variable length coding circuit 39 carries out, for example, Huffman coding to the aforementioned quantized output signal. An output signal from this variable length coding circuit 39 is supplied to a generated bit amount counter 44 where a total of generated sign amount of the picture is calculated.

On the other hand, in the reverse quantization circuit 35, corresponding to the quantization step used in the quantization circuit 34, carries out a reverse quantization to the aforementioned quantized output signal. An output from this reverse quantization circuit 35 is supplied to a reverse DCT circuit 36, where the prediction residue macro block signal is subjected to a reverse DCT processing to be decoded and supplied to a calculator 37. This calculator 37 is also supplied with a signal identical to the prediction macro block signal supplied to the aforementioned calculator 32. The calculator 37 adds the prediction macro block signal to the aforementioned decoded prediction residue macro block signal, thus enabling to obtain a locally decoded image signal. The locally decoded image signal is stored in the image memory of the motion compensation circuit 38, so as to be used as a reference image for the next motion compensation. the coded bit stream S3 is outputted from a terminal 46. This bit stream is supplied to the buffer 14 of FIG. 6. The moving picture signal coding block 25 in the digital signal coding apparatus of FIG. 6 is thus constructed.

According to the embodiment of the present invention explained above, in comparison to a conventional digital signal coding apparatus, it is possible to reduce a delay amount (memory amount) of an output multiplexed bit stream with respect to an input digital signal, simplifying the configuration, as well as to obtain a coded picture of high quality and establish a multiplex schedule with safety.

Here, the multiplexed bit stream obtained from the output terminal 24 of the aforementioned FIG. 6 is added with an error correction code and a synchronous signal and, if necessary, subjected to a recording signal processing including a predetermined modulation, so as to be recorded on a signal recording medium such as an optical disc, magnetic disc, magnetic tape, and the like. A digital signal which is read out from the signal recording medium obtained is in a safe multiplex schedule established.

Furthermore, when transmitting the multiplexed bit stream obtained from the output terminal 24 of the aforementioned FIG. 6, this bit stream is subjected, if necessary, to an addition of an error correction code and a synchronous signal as well as a transmission signal processing including a predetermined modulation, so as to be transmitted via a transmission path and a communication path. This digital signal transmission method also enables to obtain the same effect as in the aforementioned embodiment. That is, it is possible to obtain a effect to reduce a delay amount (memory amount) required for multiplexing, thus simplifying the processing and when the input digital signal is a video signal, it is possible to minimize the coded picture image quality deterioration and to establish a safe multiplex schedule when multiplexing coded bit streams. Furthermore, as the delay time until actual transmission of an input digital signal is reduced in comparison to a conventional method, there is also a merit that a time lag is reduced during a real time transmission including a news program.

It should be noted that the present invention is not to be limited to the aforementioned embodiment but can be modified in various ways within the scope of the invention. For example, a digital signal handled may be other than a moving picture signal, such as an audio signal and a sub picture signal.

According to the present invention, an input digital signal is coded and when multiplexing coded bit streams into a single bit stream, a coding control information is adaptively determined for coding the input digital signal of a predetermined unit interval, so that this coding control information is used for controlling multiplex schedule when multiplexing coded bit streams, thus enabling to control the multiplex schedule according to the coding control information for coding instead of an information such as a coded bit amount of an already coded signal. This significantly reduces a buffer memory capacity for storing a coded signal.

That is, in comparison to a conventional digital signal coding, it is possible to reduce a delay amount of an output multiplexed bit stream with respect to an input digital signal and with the reduced delay amount, to maintain a high quality without a signal deterioration while establishing a multiplex schedule with safety.

Especially in a case when an input digital signal includes a video signal, in a conventional method, several frames of delay is required in a buffer for establishing a safe multiplex schedule, whereas according to the present invention, it is possible to establish a safe multiplex schedule according to a coding control information of several frames obtained during coding such as a picture assignment coding bit amount information.

Moreover, in the digital signal transmission method using this digital signal coding technique, in addition to the aforementioned effect, it is possible to reduce a delay time from the coding of an input digital signal until output of a multiplexed bit stream, which provides a merit to reduce a time lag in a signal real-time transmission such as in news broadcast.

What is claimed is:

1. A digital signal coding method comprising:
   a feed forward control step for adaptively determining a coding control information for coding an input signal of a predetermined unit interval;
   a coding step for coding said input digital signal according to said coding control information so as to obtain a coded bit stream;
   a control step for controlling a multiplex schedule for multiplexing said coded bit stream according to the coding control information of said input signal of said unit interval;
   wherein said control information includes current and future access unit information; and
   a multiplex step for multiplexing said coded bit stream according to said multiplex schedule.

2. A digital signal coding method as claimed in claim 1, wherein said input digital signal includes a digital video signal and said unit interval is a picture which corresponds to one frame of said digital video signal.

3. A digital signal coding method as claimed in claim 2, wherein said coding control information includes an assignment coding bit amount of said picture.

4. A digital signal coding method as claimed in claim 2, wherein said coding control information includes a coding parameter of said picture.

5. A digital signal coding apparatus comprising:
   feed forward control means for adaptively determining a coding control information for coding an input signal of a predetermined unit interval;
   coding means for coding said input digital signal according to said coding control information so as to obtain a coded bit stream;
   schedule means for controlling a multiplex schedule for multiplexing said coded bit stream according to the coding control information of said input signal of said unit interval;
   wherein said control information includes current and future access unit information; and
   multiplexing means for multiplexing said coded bit stream according to said multiplex schedule.

6. A digital signal coding apparatus as claimed in claim 5, wherein said input digital signal includes a digital video signal and said unit interval is a picture which corresponds to one frame of said digital video signal.

7. A digital signal coding apparatus as claimed in claim 6, wherein said coding control information of said feed forward control means includes an assignment coding bit amount of said picture.

8. A digital signal coding apparatus as claimed in claim 6, wherein said coding control information of said feed forward control means includes a coding parameter of said picture.

9. A signal recording medium containing a multiplexed bit stream recorded, wherein said multiplexed bit stream is obtained while controlling a multiplex schedule for multiplexing a coded bit stream according to a coding control information which has been adaptively determined for coding an input signal of a predetermined unit interval and wherein said control information includes current and future access unit information.

10. A digital signal transmission method comprising:

a feed forward control step for adaptively determining a coding control information for coding an input signal of a predetermined unit interval;

a coding step for coding said input digital signal according to said coding control information so as to obtain a coded bit stream;

a control step for controlling a multiplex schedule for multiplexing said coded bit stream according to the coding control information of said input signal of said unit interval;

wherein said control information includes current and future access unit information;

a multiplex step for multiplexing said coded bit stream according to said multiplex schedule; and a transmission step for transmitting said multiplexed bit stream after subjected to a signal transmission processing.

* * * * *